United States Patent [19]
Ott

[11] Patent Number: 5,822,863
[45] Date of Patent: Oct. 20, 1998

[54] UNIVERSAL TOOL FOR ACCESSING OPTICAL FIBERS IN A FIBER OPTIC CABLE

[75] Inventor: Michael J. Ott, Taylorsville, N.C.

[73] Assignee: Siecor Corporation, Hickory, N.C.

[21] Appl. No.: 748,138

[22] Filed: Nov. 12, 1996

[51] Int. Cl.$^6$ .................................................. B21F 13/00
[52] U.S. Cl. ............................................. 30/90.4; 30/90.9
[58] Field of Search ...................... 30/90.4, 90.8, 30/90.1, 90.9, 91.1; 81/9.4, 9.41

[56] References Cited

U.S. PATENT DOCUMENTS

| | | | |
|---|---|---|---|
| 4,741,104 | 5/1988 | Noon | 30/90.4 |
| 4,972,581 | 11/1990 | McCollum et al. | 30/90.1 |
| 5,050,302 | 9/1991 | Mills | 30/90.8 |
| 5,093,992 | 3/1992 | Temple, Jr. et al. | 30/90.8 |
| 5,140,751 | 8/1992 | Faust | 30/90.4 |
| 5,443,536 | 8/1995 | Kiritsy et al. | 30/90.8 |
| 5,577,150 | 11/1996 | Holder et al. | 30/90.4 |

FOREIGN PATENT DOCUMENTS

| | | | |
|---|---|---|---|
| 39 05 694 | 4/1990 | Germany | 30/90.1 |

OTHER PUBLICATIONS

"*Single Tube Optical Fiber Access Tool* (STOFAT) *Operating Instructions*", Siecor Recommended Procedure SRP–004–033, Issue 8, Sept. 1995.

*Primary Examiner*—Hwei-Siu Payer

[57] ABSTRACT

A universal tool for cutting fiber optic cables and, more particularly, for cutting buffer tubes of various diameters and wall thicknesses includes first and second housings having respective inner surfaces. The inner surface of each housing can define a respective groove which, in turn, defines a respective longitudinal axis. The second housing is adjustably attached to the first housing so that the first and second grooves are maintained in an aligned relationship to thereby form a channel having a width which can be controllably adjusted so as to substantially match the diameter of the buffer tube to be cut, thereby allowing the universal tool to access the optical fibers within buffer tubes of different diameters. The tool also includes a first blade which is at least partially disposed in the first housing so that the first blade extends a predetermined distance into the respective groove. The position of the first blade can be adjusted relative to the first housing in order to correspondingly adjust the depth to which the blade will cut. Therefore, the universal tool can cut the buffer tube of cables having different wall thickness by controllably varying the depth to which the blade will cut.

27 Claims, 3 Drawing Sheets

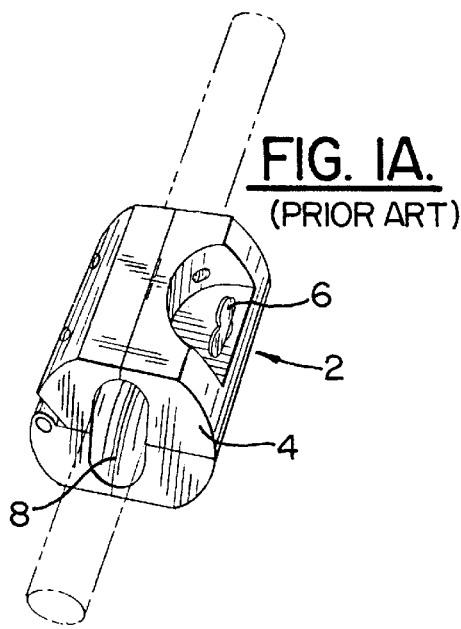
FIG. IA.
(PRIOR ART)
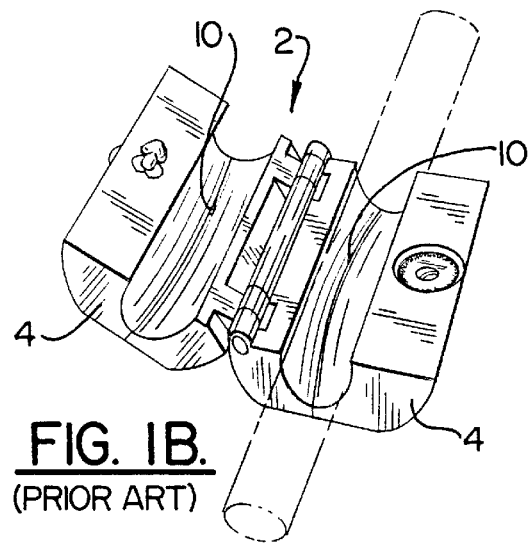
FIG. IB.
(PRIOR ART)
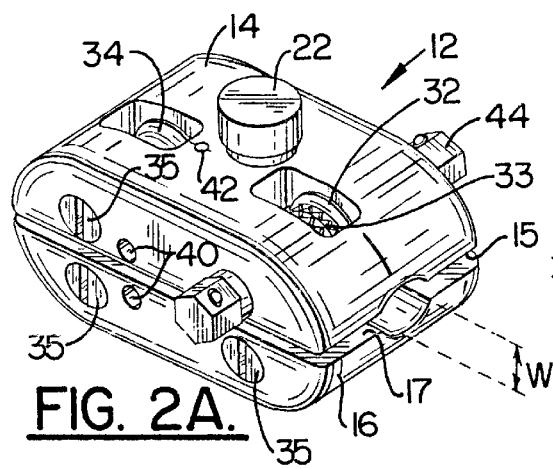
FIG. 2A.
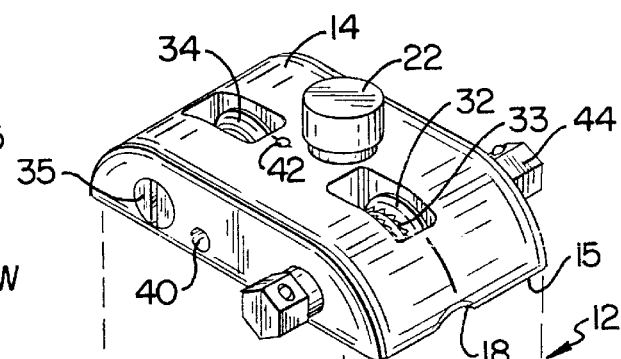
FIG. 2B.
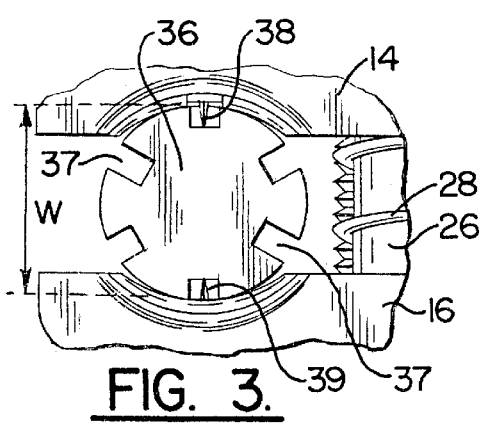
FIG. 3.
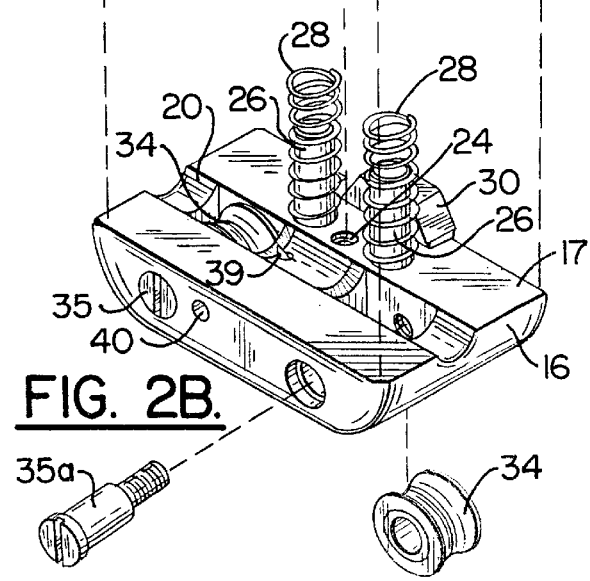

UNIVERSAL TOOL FOR ACCESSING OPTICAL FIBERS IN A FIBER OPTIC CABLE

FIELD OF THE INVENTION

The present invention relates generally to tools for cutting fiber optic cable and, more particularly, tools for accessing optical fibers in buffer tubes of various diameters and wall thicknesses.

BACKGROUND OF THE INVENTION

Optical fibers are widely used in a variety of data transmission applications including, primarily at the present, the telecommunications industry. Because optical fibers transmit voice and other data far more rapidly and efficiently than copper wire, the demand for optical fibers is continuing to increase. For example, optical fibers no longer serve merely as the medium for long distance signal transmission, but are increasingly routed directly to the home or, in some instances, directly to a desk or other work location to network computers. Because of this increasing demand for optical fibers in a variety of applications, fiber optic cable of various diameters and wall thicknesses is now being manufactured to meet the requirements of these different applications.

Many fiber optic cables include a single buffer tube in which one or more optical fibers are disposed, such as in a loose bundle or a ribbon form. Depending upon the particular application, the dimensions of the buffer tube, i.e., the diameter and wall thickness of the buffer tube, can vary dramatically in order to adequately protect the optical fibers. Fiber optic cables also generally include a protective jacket which surrounds the buffer tube in order to further protect the optical fibers.

During or following installation, one or more of the optical fibers must oftentimes be accessed at a mid-span location, i.e., at a medial location along the cable and spaced from the ends of the cable. For example, it may be necessary to access one or more optical fibers at a mid-span location in order to route and splice optical fibers. As a result special tools have been developed to access the optical fibers of a fiber optic cable at a mid-span location. Once the protective jacket has been removed or peeled back, these tools typically either split the buffer tube in equal parts or cut a channel or other opening in the buffer tube wall in order to access the optical fibers.

For fiber optic cables having a single, centrally located buffer tube, a different tool is required to access or cut into each of the various sized fiber optic cables. Thus, each tool can only effectively access the optical fibers in a single size of fiber optic cable, i.e., a fiber optic cable containing a buffer tube with a specific wall thickness and a specific outer diameter. Presently, at least six different standard sizes of fiber optic cable and associated buffer tubes are being manufactured and installed in quantity. Therefore, a cable installer or technician must typically have six different access tools in order to access the optical fibers in the various sized buffer tubes.

An example of one such access tool is the single tube optical fiber access tool (STOFAT), product number STF-110-A, manufactured by Siecor Corporation of Hickory, N.C. and shown in FIGS. 1A and 1B. This tool 2 consists of a metal housing 4 which is divided into two halves and is hinged along one side. Each half of the housing contains a groove for receiving the buffer tube to be cut as shown in FIG. 1B. When the housing is closed as shown in FIG. 1A, the grooves form a channel 8 through the housing which has a predetermined width corresponding to the diameter of the buffer tube of one of the six standard sized fiber optic cables. This tool also includes a blade 10 which is fixed in each half of the housing. The blades extend into the groove by a predetermined distance corresponding to the wall thickness of the buffer tube of the particular fiber optic cable which the tool is adapted to access.

In operation, a wing-fastener 6 is turned so that the tool halves can hingedly open as shown in FIG. 1B. The tool 2 is then placed over the buffer tube and closed such that the buffer tube extends through the channel 8 as shown in FIG. 1A. The width of the channel formed by the grooves is fixed and, as a result, the tool can only effectively access the optical fibers within buffer tubes which have a specific diameter. Similarly, the distance by which the blades 10 extend into the channel and, therefore, the depth at which the buffer tube is cut is fixed such that the tool can only effectively access the optical fibers within buffer tubes with a specific wall thickness. Once the STOFAT access tool 2 has been closed about a properly sized buffer tube as shown in FIG. 1A, the cable installer advances the tool over the buffer tube, such as by sliding the tool along the buffer tube. Due to the engagement of the blades 10 with the buffer tube of the fiber optic cable, however, conventional access tools are somewhat difficult to slide along the buffer tube since the technician must exert sufficient force, such as up to thirty pounds, in order to slice into the buffer tube. In order to minimize the surface contact and the corresponding frictional resistance between the walls of the channel 8 and the buffer tube, the opposed ends of the channel can be flared. Still, technicians are required to exert a considerable force in order to advance the tool while cutting the buffer tube.

As described above, a single STOFAT tool 2 is adapted to cut only one size of buffer tube, i.e., a buffer tube having a specific diameter and a specific wall thickness. If a STOFAT tool is employed to access the optical fibers of a fiber optic cable having a buffer tube of a different size, the tool may either damage the optical fibers or may fail to cut through the buffer tube, thereby failing to access the optical fibers. While a STOFAT access tool has been discussed above, it is believed that the access tools manufactured by other companies suffer from similar limitations.

Therefore, while a number of tools exist for accessing the optical fibers in single tube fiber optic cables, no one tool is available which can access the optical fibers in the various sizes of fiber optic cable being manufactured and installed today. Instead, conventional access tools are adapted to access the optical fibers disposed within in one specific size of fiber optic cable and the use of these tools with fiber optic cables of other sizes may damage the optical fibers or may fail to access the optical fibers. Additionally, conventional access tools require the technician to exert significant forces in order to advance the tool along the cable.

SUMMARY OF THE INVENTION

It is therefore an object of the present invention to facilitate optical fiber access by providing a single tool for accessing the optical fibers in fiber optic cables having buffer tubes of various diameters and wall thicknesses.

It is another object of the present invention to provide a tool for consistently accessing the optical fibers of a fiber optic cable without damaging the optical fibers.

It is a further object of the present invention to provide a tool for accessing the optical fibers of a fiber optic cable which significantly reduces the force which must be exerted by a technician to cut the buffer tube.

These and other objects are provided, according to the present invention, by a universal tool for cutting fiber optic cables and, more particularly, for cutting buffer tubes of various diameters and wall thicknesses. The tool includes first and second housings having respective inner surfaces. The inner surface of each housing preferably defines a respective groove which, in turn, defines a respective longitudinal axis. The second housing is adjustably attached to the first housing so that the first and second grooves are maintained in aligned relationship to thereby form a channel having a predetermined width for receiving a buffer tube of a fiber optic cable. The tool also includes a first blade defining a first plane and at least partially disposed in the first housing so that the first blade extends into the respective groove by a predetermined distance. In addition, the tool includes means for adjusting the relative positions of the first and second housings with respect to each other so that the width of the channel formed by the first and second grooves may be varied, thereby permitting the tool to receive and engage buffer tubes having different diameters.

According to one advantageous embodiment, the universal tool also includes means for fixing the relative positions of the first and second housings, such as during the cutting operations. The fixing means defines a plurality of predetermined relative positions corresponding to the various predetermined diameters of the buffer tubes to be cut so that the first blade can penetrate and cut cables of the various predetermined diameters. In the preferred embodiment, the fixing means is an adjustment wheel which has six positions corresponding to the six diameters (4.5, 6.0, 6.6, 8.0, 10.2, and 11.0 millimeters) of fiber optic cable presently being manufactured which the universal tool of the present invention is adapted to access.

The tool also preferably includes a second blade defining a second plane and at least partially disposed in the second housing so that he second blade extends into the respective groove by a predetermined distance. As a result, the first and second blades of the universal tool of this embodiment define a gap between the blades. In order to properly cut or score a buffer tube, the predetermined distances by which the first and second blades extend into the respective grooves are preferably the same. However, the universal tool can effectively access the optical fibers of a fiber optic cable even though the predetermined distances by which the first and second blades extend into the respective grooves are different so long as one or both of the blades do not extend too far through the buffer tube wall so as to cut or otherwise damage the optical fibers.

In a preferred embodiment, the first and second blades are adjustably disposed within the first and second housings, respectively. As a result, the respective predetermined distances by which the first and second blades extend into the channel may be altered depending upon the wall thickness of the buffer tube to be cut. Therefore, the universal tool of the present invention can readily access the optical fibers disposed within buffer tubes having various wall thicknesses by appropriately adjusting the predetermined distances by which the first and second blades extend into the channel.

In order to cut the buffer tube into equal segments, the first and second blades are preferably disposed in the first and second housings so that the first and second planes of the blades coincide with each other and with the longitudinal axes of the grooves defined by the first and second housings. In this embodiment, the blades are advantageously positioned 180° from each other within the channel defined by the universal tool so as to cut the buffer tube in equal parts. However, in order to cut the buffer tube into unequal parts, i.e., to cut a channel into the buffer tube, the blades may be positioned in other predetermined angular relationships without departing from the spirit and scope of the present invention.

The universal tool of the present invention is adapted to cut buffer tubes having a variety of radii up to a predetermined maximum radius. The grooves defined by the first and second housing of one advantageous embodiment are preferably semicircular with a respective radius at least as great as the predetermined maximum radius of the buffer tubes which the universal tool is adapted to cut. Thus, the semicircular grooves defined by the first and second housings serve to center the buffer tube which extends through the channel so that the appropriate portions of the buffer tube can be cut. In addition, the size of the grooves permits buffer tubes of a variety of radii to be effectively cut by the same universal tool.

The universal tool of one advantageous embodiment includes at least one roller rotatably mounted to either the first or second housing. More preferably, the universal tool can include at least a pair of opposed rollers, one of which is rotatably mounted to each of the first and second housings. Each roller preferably protrudes beyond the inner surface of the respective housing to thereby provide a roller surface for receiving and supporting a buffer tube during cutting operations. Thus, the universal tool of this embodiment can support and guide a buffer tube even in the absence of grooves within the housings.

The universal tool of one advantageous embodiment further includes means for advancing the tool along the buffer tube. The advancing means operatively engages the portion of the buffer tube within the channel so that the first blade penetrates and cuts at least a portion of the buffer tube as the advancing means advances the tool along the buffer tube. Thus, the advancing means assists in cutting the cable, thereby significantly reducing the force which must be exerted by a technician to advance the universal tool along a buffer tube. Preferably, the advancing means includes a roller having one or more rows of teeth which is rotatably disposed within the first housing so that the teeth engage a portion of the buffer tube which has not yet been cut. Thus, by rotating the toothed roller, the universal tool can be advanced along the buffer tube.

According to one advantageous embodiment, the universal tool further includes means for independently setting and calibrating the predetermined distance by which the first blade extends into the channel. Similarly, the universal tool of this embodiment can include means for independently setting and calibrating the predetermined distance by which the second blade extends into the channel. The calibrating means is preferably a slotted rod having a plurality of lengthwise extending slots. The slots have respective predetermined depths which correspond to the various wall thicknesses of the buffer tubes which the universal tool of the present invention is adapted to access. Thus, by disposing the slotted rod within the channel such that a predetermined slot is aligned with a respective one of the blades, the predetermined distance by which the respective blade extends into the channel can be set by allowing the blade to extend into the aligned slot and contact the rod, i.e., by allowing the respective blade to bottom out in the aligned slot. The calibrated position of the blade can then be fixed prior to cutting operations.

Therefore, according to the present invention, a universal tool for easily and safely accessing optical fibers in fiber optic cables having buffer tubes of various diameters and wall thicknesses is provided. In particular, the relative spacing of the first and second housings of the universal tool can be adjusted to accommodate buffer tubes of various diameters. In addition, the blades of the universal tool can be adjusted to accommodate buffer tubes of various wall thicknesses. Thus, the universal tool of the present invention eliminates the need for a technician or cable installer to carry a number of different access tools in order to access optical fibers within fiber optic cables having buffer tubes with different diameters and different wall thicknesses. In order to reduce the force required to advance the tool along a buffer tube, the universal tool of one advantageous embodiment also includes advancing means for effectively pulling the tool along the buffer tube during cutting operations.

BRIEF DESCRIPTION OF THE DRAWINGS

FIG. 1A is a perspective view of a conventional access tool in the closed or operative position.

FIG. 1B is a perspective view of the conventional access tool in the opened position for receiving a buffer tube.

FIG. 2A is a perspective view of one embodiment of an access tool of the present invention illustrating the various components of the tool.

FIG. 2B is an exploded perspective view of the embodiment of the access tool shown in FIG. 2A according to the present invention illustrating the various components of the tool in more detail.

FIG. 3 is a fragmentary end view of the embodiment of the tool of the present invention shown in FIG. 2A which illustrates one means by which the depth of the blades can be calibrated and set.

DETAILED DESCRIPTION OF THE PREFERRED EMBODIMENTS

Figure 4A:
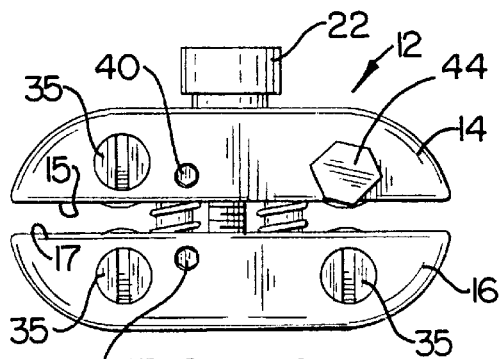
FIG. 4A is a plan view of the side of the tool of the present invention shown in FIG. 2A.

The present invention will now be described more fully hereinbelow with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete and will fully convey the scope of the invention to those skilled in the art. Like numbers refer to like elements throughout.

Referring now to FIGS. 2A and 2B, a universal access tool 12 according to one embodiment of the present invention is illustrated. The access tool 12 includes a first housing 14 and second housing 16. The first housing 14 preferably has an inner surface 15 which contains a lengthwise extending first groove 18 which, in turn, defines a respective longitudinal axis. Likewise, the second housing 16 preferably has an inner surface 17 which contains a lengthwise extending second groove 20 which, in turn, defines a respective longitudinal axis.

The first and second housings 14, 16 are adjustably attached so that the first and second grooves 18, 20 are maintained in an aligned relationship. As shown in FIG. 2A and explained further hereinafter, the aligned grooves defined by the respective housings form a channel for receiving a lengthwise extending buffer tube 52 of a fiber optic cable. The universal tool 12 of the present invention is adapted to cut buffer tubes having a variety of radii up to a predetermined maximum radius. The respective grooves defined by the first and second housing of one advantageous embodiment are preferably semicircular with a respective radius at least as great as the predetermined maximum radius of the buffer tubes which the universal tool is adapted to cut. Thus, the semicircular grooves defined by the first and second housings serve to center the buffer tube which extends through the channel so that the appropriate portions of the buffer tube can be cut. In addition, the size of the grooves permits buffer tubes of a variety of radii to be effectively cut by the same universal tool. Alternatively, the grooves 18, 20 may be V-grooves or other suitable cross-sectional shape.

The tool 12 also includes means for adjusting the relative positions of the first and second housings with respect to each other so that the width W of the channel may be varied to accommodate buffer tubes 52 of different diameters. While the relative positions of the housings can be adjusted in a variety of fashions without departing from the spirit and scope of the present invention, the adjusting means of the illustrated embodiment includes a thumb screw 22 extending through the first housing 14 for operably engaging a threaded aperture 24 defined in the second housing 16 as shown more clearly in FIG. 2B. By threadably advancing or retracting the thumb screw within the threaded aperture, the width of the channel can be decreased or increased, respectively.

In order to properly align the first and second housings, the universal tool 12 can also include one or more fixed pins or bolts 26 which extend outwardly from the second housing 16 for insertion into respective apertures defined by the first housing 14 which open through the inner surface 15 thereof. Further, in order to outwardly bias the first and second housings and to thereby maintain separation between the housings, the universal tool can include one or more springs 28 disposed on respective ones of the pins 26. By outwardly biasing the first and second housings, a buffer tube 52 can be more readily inserted into the tool in the manner described hereinbelow.

Figure 4B:
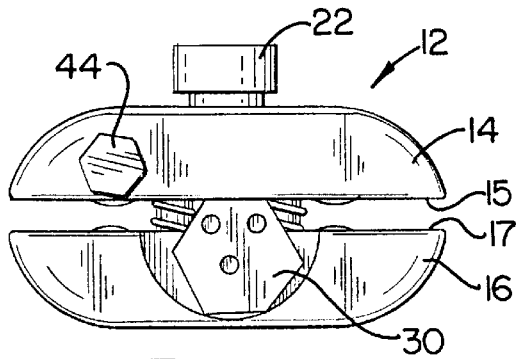
FIG. 4B is a plan view of the side of the tool of the present invention opposite that shown in FIG. 2A which illustrates one means for fixing the relative positions of the first and second housings.

As best shown in FIG. 4B, the tool 12 includes means for fixing the relative positions of the first and second housing so as to thereby fix the width W of the channel through which the buffer tube 52 will extend. While the relative positions of the housings can be fixed in a variety of fashions without departing from the spirit and scope of the present invention, the fixing means of the illustrated embodiment includes an adjustment wheel 30 rotatably connected to a recessed side portion of the second housing 16. The adjustment wheel 30 is eccentrically shaped to define a plurality of predetermined relative positions for the first and second housings which correspond to channel widths which match the various predetermined diameters of the buffer tubes to be cut. Although not illustrated, indicia representative of each of these predetermined relative positions may be engraved on the adjustment wheel 30 to assist the technician in properly positioning the first and second housings so as to cut a buffer tube of a predetermined diameter. For example, the universal tool of the illustrated embodiment includes an adjustment wheel 30 having six predetermined relative positions which correspond to fiber optic cable having six different predetermined diameters, such as 4.5 mm, 6.0 mm, 8.0 mm, 10.2 mm and 11.0 mm and, as a result, also having buffer tubes of different sizes.

The universal access tool 12 also includes a first blade 38 which is at least partially disposed within the first housing 14. The first blade extends outwardly from the first housing and into the first groove 18 defined thereby so as to engage and cut a buffer tube 52 during cutting operations. Likewise, the universal access tool can include a second blade 39 which is at least partially disposed within the second housing 16 and which extends into the second groove 20 defined thereby so as to also engage and cut a buffer tube during cutting operations. Both blades extend into the channel defined by the aligned grooves by a respective predetermined distance. Since the buffer tube to be cut extends through the channel, the depth to which the blades cut into the buffer tube can be set by controllably selecting the respective predetermined distances by which the blades extend into the channel.

The first blade 38 includes a cutting edge and defines a first plane which preferably coincides with the longitudinal axis of the first groove 18 so that the cutting edge of the first blade is positioned to cut the buffer tube 52 as the universal tool 12 advances along the cable in the manner described hereinbelow. Similarly, the second blade 39 also includes a cutting edge and defines a second plane which coincides with the longitudinal axis of the second groove 20 so that the cutting edge of the second blade will also cut the buffer tube 52 as the universal tool is advances along the buffer tube.

Figure 8:
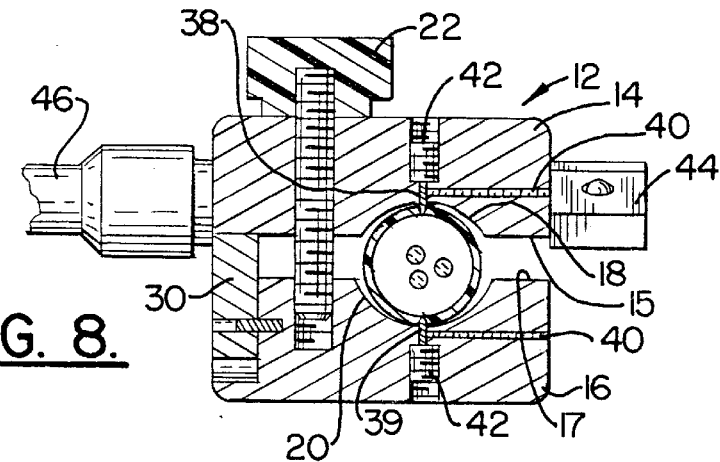
FIG. 8 is a cross-sectional view of the embodiment of the present invention illustrated in FIG. 2A and taken along line 8—8 of FIG. 7 which illustrates the engagement of the first and second blades with the buffer tube.

The first and second blades 38, 39 are preferably positioned in a predetermined angular relationship. As shown in FIGS. 3 and 8, for example, the first and second blades can be angularly separated by about 180° so that the buffer tube 52 will be cut in equal parts, i.e., opposite sides of the cable will be cut. However, the first and second blades 38, 39 may be positioned in the first and second housings 14, 16 so as to define an angular separation of less than 180° in order to cut a channel or other opening into the buffer tube 52 without departing from the spirit and scope of the present invention.

As shown in FIG. 4A, the universal tool 12 also includes means, such as set screws 40, for fixing the position of the blades relative to the respective housing. In particular, the universal tool can include first and second set screws which extend through side portions of the first and second housings 14, 16, respectively, for engaging the first and second blades 38, 39, respectively. Thus, by threadably advancing a set screw 40, the position of the respective blade can be fixed relative to the housing. Similarly, by loosening a set screw 40, the position of the respective blade relative to the housing can be adjusted as described hereinbelow.

Figure 5A:
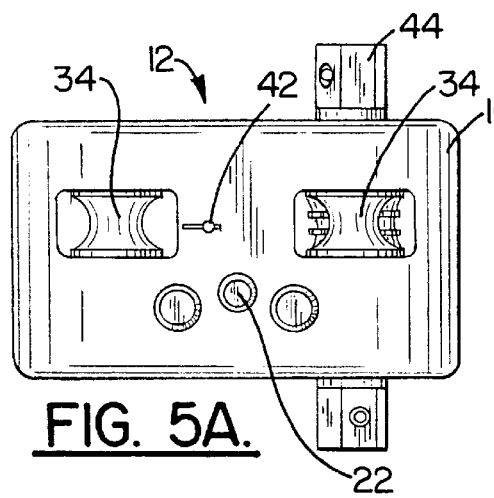
FIG. 5A is a bottom view of the embodiment of the tool of the present invention shown in FIG. 2A which illustrates the drive means for advancing the tool along a buffer tube.
Figure 5B:
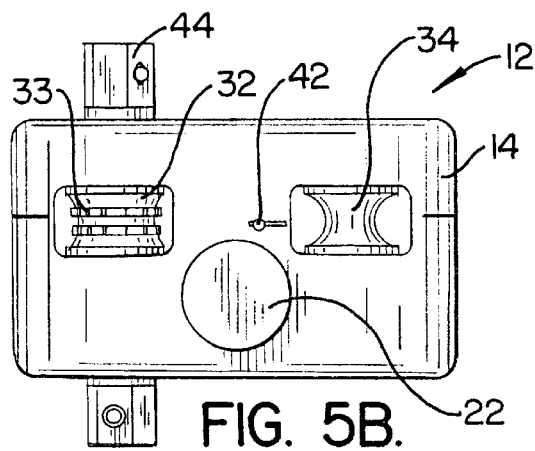
FIG. 5B is a top view of the embodiment of the tool of the present invention shown in FIG. 2A which further illustrates the drive means for advancing the tool along a buffer tube.

As shown in FIGS. 5A and 5B, the universal tool 12 can also include first and second additional set screws 42 which extend through the outer surfaces of the first and second housings 14, 16, respectively, for engaging a rear portion of the first and second blades 38, 39, respectively. Since each blade is preferably larger than the respective opening through which the blade extends into the channel, the blades are therefore secured at least partially within the respective housings by the engagement of the rear portion of the respective blades with these additional set screws 42. Further, these additional set screws 42 which must be removed to replace the blades are also generally removed to adjust the relative position of the blades.

As shown in FIG. 3, the universal tool 12 can also include means, such as a calibration tool 36, for calibrating and setting the predetermined distances by which the blades 38, 39 extend into the channel. In one advantageous embodiment, the calibration tool is a lengthwise extending rod which defines a plurality of lengthwise extending slots 37 having respective predetermined depths.

In order to adjust the position of the blades 38, 39, each of the set screws, i.e., the set screws 40 which extend through the side surfaces of the housings as well as the set screws 42 which extend through the outer surfaces of the housings, are loosened or removed. The calibration tool 36 can then be disposed within the channel defined by the universal tool 12 as shown in FIG. 3 such that the first and second blades extend into different ones of the lengthwise extending slots 37 defined by the rod. The blades can then be positioned so as to contact the bottom surface of the respective slots, such as by pushing the blades through the opening and further into the channel until the blades bottom out in the respective slots. The blades can then be locked in position by inserting and threadably advancing the set screws 42 which extend through the outer surfaces of the housings and the set screws 40 which extend through the side surfaces of the housings.

In order to set the blades 38, 39 so as to cut through buffer tubes 52 which have different wall thicknesses, the calibration tool 36 preferably defines slots 37 of different predetermined depths as shown in FIG. 3. In particular, the depth of each slot of the calibration tool preferably corresponds to a predetermined buffer tube wall thickness since the depth to which the respective blade will cut is set or determined by the depth of the slots. Thus, to access the optical fibers 53 within a buffer tube having thick walls, the blades are preferably set within a deeper slot so as to extend further into the channel. Since the respective predetermined distances by which the first and second blades extend into the channel are preferably identical, the calibration tool advantageously defines pairs of slots which have the same depth and which are diametrically opposed. However, the calibration tool can define any number or arrangement of slots with any respective predetermined depths without departing from the spirit and scope of the present invention.

Thus, prior to cutting a buffer tube 52, the first and second housings 14, 16 are preferably opened or separated, such as threadably retracting the thumb screw 22. Thereafter, the adjustment wheel 30 is rotated until the position of the adjustment wheel corresponds to the predetermined relative positions of the first and second housing which will define a channel having a width which matches the diameter of the buffer tube to be cut. In addition, the relative positions or depth of the blades 38, 39 are preferably set in the manner described above such that the universal tool 12 and, more particularly, the blades are adapted to cut through the buffer tube 52 to be cut without cutting or otherwise damaging the optical fibers 53.

Figure 6:
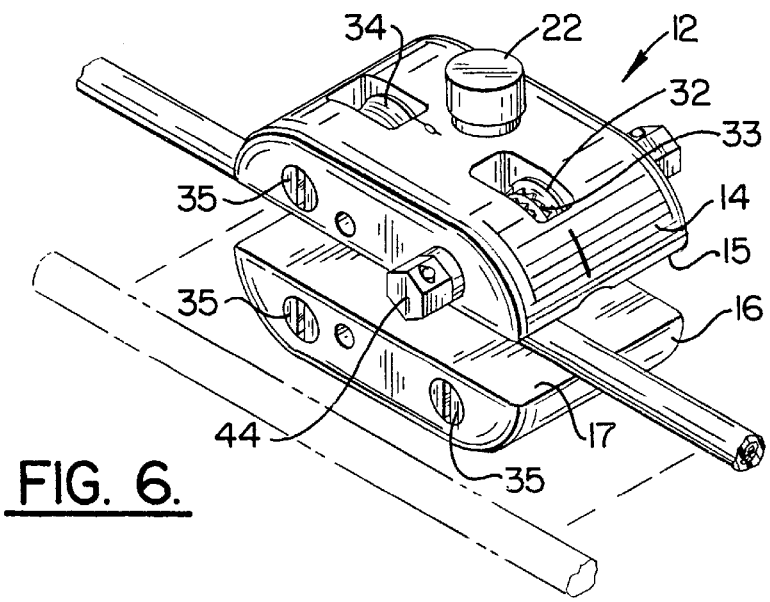
FIG. 6 is a perspective view of the embodiment of the tool of the present invention shown in FIG. 2A which illustrates the insertion of the tool over a buffer tube to be cut.

While the universal tool 12 could be used to cut through both the protective jacket and the buffer tube 52 of a single tube fiber optic cable, the protective jacket and the strength members of the fiber optic cable are typically removed or pulled back in a conventional manner prior to cutting the now exposed buffer tubes. In particular, once the protective jacket has been removed and the universal tool has been inserted over one of the buffer tubes as shown in FIG. 6, the respective relative positions of the first and second housings 14, 16 can be set, such as by threadably advancing the thumb screw 22 until the inner surface 15 of the first housing 14 contacts the adjustment wheel 30. Accordingly, the adjustment wheel 30 not only sets the width of the channel to match or correspond to the outer diameter of the cable to be cut, but also maintains the proper width of the channel during the cutting operations so that the blades which extend into the grooves as described hereinbelow do not damage the optical fibers 53 by cutting too deeply into the buffer tube. In addition, as the first and second housings are drawn together as described above, the first and second blades 38, 39 are plunged into opposite sides of the buffer tube. Since the depth of the blades has been set based upon the anticipated wall thickness of the buffer tube, the blades will preferably extend through the buffer tube, but will not contact the optical fibers 53 disposed within the buffer tube as shown in FIG. 8.

Thereafter, the universal tool 12 can be advanced along the buffer tube 52 such that the opposite sides of the buffer tube are slit, thereby providing access to the optical fibers 53. According to one advantageous embodiment, the universal access tool 12 includes means for advancing the tool along the buffer tube so as to cut opposite sides of the buffer tube. As shown in FIGS. 2A, 2B and 5B, the advancing means preferably includes a drive capstan 32, such as a roller which includes one or more rows of sprockets or teeth 33 for engaging the cable. The drive capstan is preferably connected to an externally accessible drive shaft 44 such that rotation of the drive shaft also rotates the drive capstan.

The drive capstan 32 is preferably rotatably disposed within an opening defined by one of the housings, such as the first housing 14 in the illustrated embodiment. As shown in FIG. 2B, the opening in which the drive capstan is disposed is preferably aligned with the respective groove 18 such that the drive capstan can engage the buffer tube 52 as the buffer tube extends through the channel defined by the aligned grooves. As also shown, the drive capstan preferably defines a generally U-shaped or semicircular engagement surface which is substantially aligned with the U-shaped portion of the inner surface of the housing which defines the groove. However, the teeth 33 of the drive capstan preferably extend a slight distance into the groove so as to operably engage the buffer tube to be cut.

The universal access tool 12 can also include one or more additional rollers 34 to receive and support the buffer tube 52 which extends through channel and to minimize frictional resistance as the tool advances along the buffer tube 52. Although the embodiment of the universal tool shown in FIGS. 4B, 5A, and 5B also includes a drive capstan 32, the additional rollers, such as the three rollers rotatably mounted within respective openings defined by the first and second housings 14, 16 of the illustrated embodiment, need not be employed in conjunction with a drive capstan, but can support a buffer tube within a universal tool which does not include advancing means. As described above in conjunction with the drive capstan 32, however, the openings in which these additional rollers are rotatably disposed also open through the inner surface of the respective housing and, in one embodiment, open into and are aligned with the grooves defined by the respective housings. The rollers can be rotatably mounted within the housings in a variety of manners without departing from the spirit and scope of the present invention. However, as shown in FIG. 2B, the rollers can be mounted within the respective housings by means of shoulder screws 35 which extend through the respective openings and which each include a relative smooth shaft portion 35a for supporting the roller within the housing.

As also described above in conjunction with the drive capstan 32, these additional rollers 34 preferably define a generally U-shaped or semicircular engagement surface which is substantially aligned with or slightly protrude beyond the U-shaped portion of the inner surface of the respective housing which defines the respective groove. Alternatively, the universal tool 12 can include first and second housings which do not define grooves, but which rotatably support one or more rollers which protrude slightly beyond the inner surface of the respective housing. In either embodiment, rollers preferably support the buffer tube 52, at least partially, within the tool 12 so as to thereby reduce the frictional force which must be overcome to advance the tool along the buffer tube during the cutting operations.

Although not required, these additional rollers 34 can be replaced prior to cutting operations with rollers of a different size which define a U-shaped or semicircular engagement surface which more closely matches the exterior surface and exterior diameter of the buffer tube 52 to be cut in order to thereby more fully support the buffer tube. In addition, while three additional rollers are shown, the universal tool of the present invention can include any number of additional rollers, including none, which are rotatably mounted in one or both housings without departing from the spirit and scope of the present invention.

Figure 7:
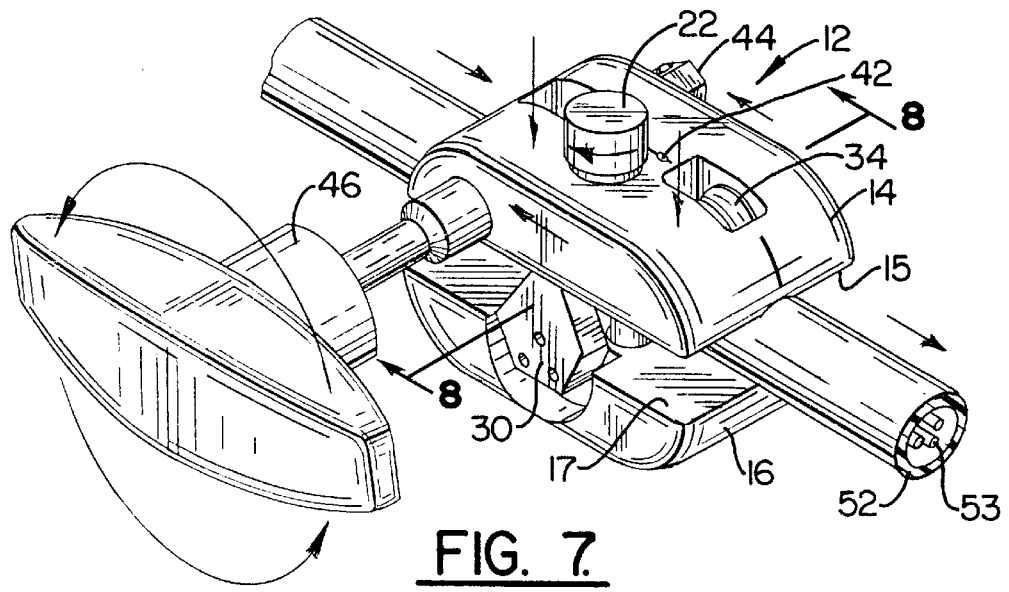
FIG. 7 is a perspective view of the embodiment of the present invention shown in FIG. 2A which illustrates the engagement of the tool with the buffer tube prior to advancing the tool along the buffer tube.
Figure 9:
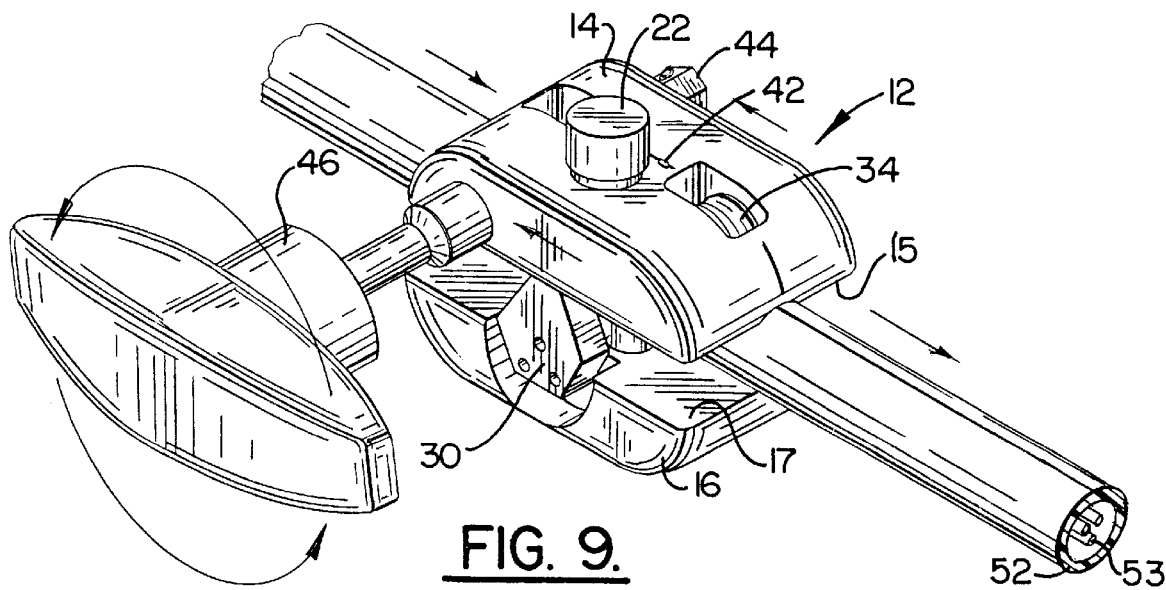
FIG. 9 is a perspective view of the embodiment of the tool of the present invention shown in FIG. 2A which illustrates the advancement of the tool along the buffer tube and the corresponding cuts or slits formed along the buffer tube.

As shown in FIGS. 7 and 9, the adjusting means of the universal tool 12 of the present invention can also include a handle 46 which can be removably attached to either end of the drive shaft 44. As a result, the technician can rotate the handle in order to advance the universal tool along the buffer tube 52. In particular, rotation of the handle rotates the drive capstan 32 in the same direction. As a result of the engagement of the teeth 33 of the drive capstan with the buffer tube, this rotation of the drive capstan will advance the universal tool along the buffer tube. By advancing the universal tool along the buffer tube as shown in FIG. 9, the blades 38, 39 cut through the buffer tube 52, typically on opposite sides of the buffer tube, to thereby provide mid-span access the optical fibers 53 without damaging the optical fibers.

As described above, the universal tool 12 of the present invention provides easy and safe mid-span access to the optical fibers 53 of fiber optic cables having one or more buffer tubes 52 of various diameters and wall thicknesses. In particular, the relative spacing of the first and second housings 14, 16 of the universal tool can be adjusted to accommodate buffer tubes of various diameters. In addition, the blades 38, 39 of the universal tool can be adjusted to appropriately cut through buffer tubes of various wall thicknesses without cutting or otherwise damaging the optical fibers. Thus, the universal tool of the present invention eliminates the need for a technician or cable installer to carry a number of different access tools in order to access optical fibers within fiber optic cables having buffer tubes with different diameters and different wall thicknesses. In order to reduce the force required to advance the tool along a buffer tube, the universal tool of one advantageous embodiment also includes advancing means for effectively advancing the tool along the buffer tube during cutting operations.

In the drawings and specification there has been set forth preferred embodiments of the invention and, although specific terms are employed, the terms are used in a generic and descriptive sense only and not for the purpose of limiting the scope of the invention being set forth in the following claims.

That which is claimed is:

1. A tool for cutting buffer tubes having a range of radii up to a predetermined maximum radius, the tool comprising:

a first housing having at least one inner surface, wherein said inner surface contains a first semicircular groove defining a first longitudinal axis;

a second housing having at least one inner surface containing a second semicircular groove defining a second longitudinal axis, wherein said first housing is adjustably attached to said second housing such that said first and second semicircular grooves are maintained in aligned relationship to thereby form a channel having a width for receiving a buffer tube, and wherein each of said first and second semicircular grooves have a respective radius at least as great as the predetermined maximum radius of the buffer tubes such that said first and second semicircular grooves receive and center buffer tubes having a range of radii up to the predetermined maximum radius;

a first blade defining a first plane and at least partially disposed in said first housing such that said first blade extends into said first groove a predetermined distance;

a second blade defining a second plane and at least partially disposed in said second housing such that said second blade extends into said second groove by said predetermined distance such that said first and second blades define a gap between said blades and;

means for adjusting the relative positions of said first and second housings with respect to each other wherein the width of said channel may be varied.

2. A tool according to claim 1 wherein said first and second blades are adjustably disposed so that said predetermined distance can be changed for cutting cables of various wall thicknesses.

3. A tool according to claim 1 further comprising means for advancing the tool along the buffer tube, wherein said advancing means operatively engages the buffer tube within the channel such that said first blade penetrates and cuts at least a portion of the buffer tube as said advancing means advances the tool along the buffer tube.

4. A tool according to claim 1 wherein the first and second semicircular grooves are defined by the inner surface of the first and second housings, respectively.

5. A tool for cutting buffer tubes of various diameters comprising:

a first housing having at least one inner surface, said inner surface containing a first groove defining a first longitudinal axis;

a second housing having at least one inner surface, said surface containing a second groove defining a second longitudinal axis, and said first housing adjustable, disposed on said second housing such that said first and second grooves are maintained in aligned relationship to thereby form a channel for receiving a buffer tube and wherein said channel defines a width;

a first blade defining a first plane and at least partially disposed in said first housing such that said first blade extends into said first groove a predetermined distance;

means for adjusting relative positions of said first and second housings with respect to each other wherein the width of said channel can be varied and;

means for fixing the relative positions of said first and said second housings, wherein said means defines a plurality of predetermined relative positions corresponding to various predetermined diameters of the buffer tubes to be cut such that said first blade can penetrate and cut buffer tubes of the various predetermined diameters.

6. A tool according to claim 5 further comprising a second blade defining a second plane and at least partially disposed in said second housing such that said second blade extends into said second groove said predetermined distance such that said first and second blades define a gap between said blades.

7. A tool according to claim 6 wherein said first and second planes coincide each other and with said first and second longitudinal axes.

8. A tool according to claim 6 wherein said first and second blades are adjustably disposed so that said predetermined distance can be changed or cutting buffer tubes of various wall thicknesses.

9. A tool according to claim 5 further comprising means for advancing the tool along the buffer tube, wherein said advancing means operatively engages the buffer tube within the channel such that said first blade penetrates and cuts at least a portion of the buffer tube as said advancing means advances the tool along the buffer tube.

10. A tool according to claim 5 wherein the first groove and the second groove are semi-circular and defined by the inner surface of the first housing and the second housing, respectively.

11. A tool for cutting buffer tubes of various wall thicknesses comprising:

a first housing having at least one inner surface, said surface containing a first groove defining a first longitudinal axis;

a second housing having at least one inner surface, said surface containing a second groove defining a second longitudinal axis, and said first housing adjustably attached to said second housing such that said first and second grooves form a channel for receiving a buffer tube and wherein said channel defines a width;

a first blade defining a first plane and adjustably disposed at least partially within said first housing such that said first blade extends into said first groove a predetermined distance;

means for adjusting said first blade so that said predetermined distance by which said first blade extends into said first groove can be varied such that said first blade can penetrate and cut buffer tubes of various diameters and;

means for fixing relative positions of said first and second housings, wherein said fixing means defines a plurality of predetermined relative positions corresponding to various predetermined diameters of the buffer tubes to be cut such that said first blade can penetrate and cut buffer tubes of the various predetermined diameters.

12. A tool according to claim 11 further comprising a second blade defining a second plane and adjustably disposed at least partially within said second housing such that said second blade extends into said second groove said predetermined distance such that said first and second blades define a gap between them.

13. A tool according to claim 11 further comprising means for adjusting relative positions of said first and second housings with respect to each other wherein the width of said channel can be varied.

14. A tool according to claim 11 further comprising means for advancing the tool along the buffer tube, wherein said advancing means operatively engages the buffer tube within the channel such that said first blade penetrates and cuts at least a portion of the buffer tube and said advancing means advances the tool along the buffer tube.

15. A tool according to claim 11 wherein the first groove and the second groove are semi-circular and defined by the inner surface of the first housing and the second housing, respectively.

16. A tool for cutting buffer tubes of various diameters and wall thicknesses comprising:

a first housing having at least one inner surface, said surface containing a first groove defining a first longitudinal axis;

a second housing having at least one inner surface, said surface containing a second groove defining a second longitudinal axis, and said first housing adjustably attached to said second housing such that said first and second grooves form a channel for receiving a buffer tube and wherein said channel defines a width;

a first blade defining a first plane and adjustably disposed at least partially within said first housing such that said first blade extends into said first groove a predetermined distance;

means for advancing the tool along the buffer tube, wherein said advancing means operatively engages the buffer tube within the channel such that said first blade penetrates and cuts at least a portion of the buffer tube and said advancing means advances the tool along the buffer tube and;

means for fixing relative positions of said first and second housings, wherein said fixing means defines a plurality of predetermined relative positions corresponding to various predetermined diameters of the buffer tubes to be cut such that said first blade can penetrate and cut buffer tubes of the various predetermined diameters.

17. A tool according to claim 16 further comprising a second blade defining a second plane and adjustably disposed at least partially within said second housing such that said second blade extends into said second groove said predetermined distance such that said first and second blades define a gap between them.

18. A tool according to claim 16 further comprising at least one roller to facilitate advancing said first housing and said second housing along the buffer tube.

19. A tool according to claim 16 further comprising rollers for facilitating proper centering of the buffer tube in said channel.

20. A tool according to claim 16 wherein the first groove and the second groove are semi-circular and defined by the inner surface of the first housing and the second housing, respectively.

21. A tool for cutting buffer tubes of various predetermined diameters comprising:

a first housing having at least one inner surface, said surface containing a first groove defining a first longitudinal axis;

a second housing having at least one inner surface, said surface containing a second groove defining a second longitudinal axis, and said first housing adjustably attached to said second housing such that said first and second grooves form a channel for receiving a buffer tube and wherein said channel defines a width;

a first blade defining a first plane and adjustably disposed at least partially within said first housing such that said first blade extends into said first groove a predetermined distance;

independent means for calibrating the predetermined distance of said first blade and;

means for adjusting relative positions of said first and second housings with respect to each other wherein the width of said channel can be varied.

22. A tool according to claim 21 wherein the first groove and the second groove are semi-circular and defined by the inner surface of the first housing and the second housing, respectively.

23. A tool for cutting buffer tubes of various diameters comprising:

first and second housings having respective inner surfaces, wherein said first and second housings are adjustably connected such that said first and second housings can be controllably spaced;

at least one roller rotatably mounted to at least one of said first and second housings such that said roller at least partially protrudes beyond the inner surface of the respective housing to thereby provide a roller surface for receiving and supporting a buffer tube which extends between said first and second housings as the tool is advanced along the buffer tube;

a first blade aligned with said roller and at least partially disposed in said first housing such that said first blade extends beyond the inner surface of said first housing by a predetermined distance for cutting the buffer tube as the tool is advanced therealong and;

means for adjusting relative positions of said first and second housings with respect to each other such that said first and second housings can be controllably spaced.

24. A tool according to claim 23 further comprising a second blade defining a second plane and at least partially disposed in said second housing such that said second blade beyond the respective inner surface by said predetermined distance such that said first and second blades define a gap between said blades.

25. A tool according to claim 24 wherein said first and second blades are adjustably disposed so that said predetermined distance can be changed for cutting buffer tubes of various wall thicknesses.

26. A tool according to claim 23 further comprising means for advancing the tool along the buffer tube, wherein said advancing means operatively engages the buffer tube within the channel such that said first blade penetrates and cuts at least a portion of the buffer tube as said advancing means advances the tool along the buffer tube.

27. A tool according to claim 23 wherein said at least one roller comprises first and second rollers rotatably mounted to said first and second housings, respectively.

* * * * *